United States Patent

Anderson et al.

[11] Patent Number: 5,844,377
[45] Date of Patent: Dec. 1, 1998

[54] KINETICALLY MULTICOLORED LIGHT SOURCE

[76] Inventors: Matthew E. Anderson, 1789 E. 25th Ave., Eugene, Oreg. 97403; Thomas A. Hughes, 181 Monroe St., Eugene, Oreg. 97402

[21] Appl. No.: 820,517

[22] Filed: Mar. 18, 1997

[51] Int. Cl.$^6$ .................................................. H05B 41/16
[52] U.S. Cl. ........................... 315/251; 315/167; 315/82; 331/108 D; 331/47; 331/DIG. 3
[58] Field of Search .................. 315/77, 82, 167, 315/169.1, 169.3, 251, 271; 331/47, 57, 74, 75, DIG. 3, 108 D, 111, 177 R

[56] References Cited

U.S. PATENT DOCUMENTS

| | | | |
|---|---|---|---|
| 4,038,611 | 7/1977 | Greig | 331/108 D |
| 4,298,868 | 11/1981 | Spurgeon . | |
| 4,754,202 | 6/1988 | Havel | 315/169.1 |
| 4,810,937 | 3/1989 | Havel | 315/152 |
| 5,032,098 | 7/1991 | Balogh et al. . | |
| 5,057,827 | 10/1991 | Nobile et al. . | |
| 5,066,929 | 11/1991 | Frantz . | |
| 5,145,444 | 9/1992 | VanKuiken . | |
| 5,406,300 | 4/1995 | Tokimoto et al. . | |
| 5,418,697 | 5/1995 | Chiou . | |

*Primary Examiner*—Don Wong
*Assistant Examiner*—Haissa Philogene
*Attorney, Agent, or Firm*—David S. Alavi

[57] ABSTRACT

A kinetically multicolored light source is described, comprising: a light source capable of producing a plurality of primary colors; oscillatory means for driving said light source; and means for moving said light source. The oscillatory driving means may drive the light source so that one or more of the primary colors is alternately turned on and off at a frequency above the critical fusion frequency of an observer, whereby each of the colors appears to emanate simultaneously and continuously thereby appearing to the observer as a single secondary color when the light source moves slowly with respect to the observer.

The light source may move relative to the observer sufficiently rapidly that each of the oscillating primary colors if viewed alone would appear to the observer to emanate from bright segments of a curvilinear path with intervening dark segments. When viewed together the path segments for each of the primary colors may spatially overlap to varying degrees depending on the relative frequency, amplitude, phase, and duty cycle at which each of the primary colors is produced. The observer may therefore observe a myriad of color alternation pattern along the curvilinear path, which may comprise one or more of: dark segments, bright primary color segments, and bright secondary color segments. Thus, by moving the light source sufficiently rapidly relative to the observer, visually striking, intriguing, and/or pleasing multicolored illuminated displays may be produced by a light source which appears monocolored when moving relatively slowly relative to the observer.

36 Claims, 3 Drawing Sheets

KINETICALLY MULTICOLORED LIGHT SOURCE

FIELD OF THE INVENTION

The field of the present invention relates to light sources. In particular, a kinetically multicolored light source is described herein for producing visually striking, intriguing and/or pleasing multicolored illuminated displays.

BACKGROUND

Illuminated displays are generated in a wide variety of ways for a wide variety of purposes, both aesthetic and utilitarian. Motion and/or multiple colors may be used to enhance an illuminated display. The unique characteristics of human vision are frequently exploited in the generation of moving and/or multicolored displays.

The relatively low frequency response characteristics exhibited by the human visual system may be used to allow a display producing lights of only a few primary colors to appear to an observer to produce a nearly infinite range of secondary colors by rapid oscillation between two or more primary colors. The frequency of oscillation should be above a critical visual fusion frequency (at or above about 5–10 Hz) in order to appear continuous to the observer. Variation of the amplitude and duty cycle of the oscillations gives rise to variations in the secondary color thus produced. An example of such a device is described in U.S. Pat. No. 5,066,929, which discloses a light source comprising a pair of light-emitting diodes (LED's) connected in parallel with opposing polarities and emitting different primary colors. By applying an alternating signal across the pair of LED's at sufficiently high frequencies, both primary colors are alternately produced but appear to a human observer to always produce a single secondary color. The relative amounts of each of the two primary colors which contribute to the secondary color depend upon the duty cycle and amplitude of the alternating drive signal.

Visual persistence of the human eye may be exploited to generate what appear to be extended multidimensional illuminated displays using only a small number of discrete but rapidly moving light sources. A localized illumination source moved rapidly along a curvilinear path appears to a human observer to produce an illuminated path in space, particularly if there is relatively high contrast between the light source and the background. Techniques based on this effect may allow quite complex displays to be generated with a relatively small number of light sources. Rapidly varying the curvilinear path may cause the resulting display to appear to move. Examples of this technique are described in U.S. Pat. Nos. 5,057,827, 5,406,300, and 4,298,868.

The techniques described in the preceding two paragraphs are not restricted to human observers only. Any vision system exhibiting limited frequency response and/or persistence effects would also be subject to such displays. For example, a still camera would record on film the secondary color produced by alternation between two primary colors, provided the shutter speed were slow relative to the alternation between the primary colors. Likewise a continuous curvilinear path could be captured on film if the localized light source moved along the path during the time during which the shutter was open.

Illuminated displays which appear to move may also be produced by arrays of stationary light sources in which individual sources are turned on or off to produce moving patterns of light on the array. This is the principle behind the well known scrolling theater marquis and the now ubiquitous scrolling alphanumeric LED (light-emitting diode) display.

Finally, the use of illumination sources in various toys and amusement devices is well known, such as bicycles, skates, yo-yos, flying discs (Frisbees®) and other toys with rapidly moving parts to which a light source may be attached thereby resulting in a striking visual display when the toys are used. Examples are described in U.S. Pat. Nos. 5,145,444, 5,418,697, and 5,032,098. Furthermore, such illumination devices may enhance the safety of bicycles and the like.

SUMMARY OF THE INVENTION

Certain aspects of the preset invention may advance the state-of-the-art of methods and apparatus for producing visually striking, intriguing, and/or pleasing multicolored illuminated displays, and in addition may meet one or more of the following objects:

To provide methods and apparatus for producing visually striking, intriguing, and/or pleasing multicolored illuminated displays;

To provide methods and apparatus for producing visually striking, intriguing, and/or pleasing multicolored illuminated displays wherein a light source appears monocolored when moving sufficiently slowly relative to a field of view of an observer;

To provide methods and apparatus for producing visually striking, intriguing, and/or pleasing multicolored illuminated displays wherein the light source appears multicolored when moving sufficiently rapidly relative to a field of view of an observer; and To provide methods and apparatus for producing visually striking, intriguing, and/or pleasing multicolored illuminated displays wherein a multicolored illuminated curvilinear path is observed when a light source moves sufficiently rapidly relative to a field of view of an observer.

One or more of these objects may be achieved according to the present invention by a kinetically multicolored light source, comprising: a light source capable of producing a plurality of primary colors; oscillatory means for driving said light source; and means for moving said light source. The oscillatory driving means may drive the light source so that one or more of the primary colors emanating from the light source is alternately turned on and off at a frequency above the critical fusion frequency of an observer, whereby each of the colors appears to emanate simultaneously and continuously thereby appearing to the observer as a single total secondary color when the light source moves slowly with respect to a field of view of the observer.

The light source may move relative to the field of view of the observer sufficiently rapidly that each of the oscillating primary colors if viewed alone would appear to the observer to emanate from bright segments of a curvilinear path with intervening dark segments. This segmentation of the curvilinear path for each of the oscillating primary colors arises from the oscillatory driving of each of the primary colors combined with the rapid movement of the light source and the light persistence of the observer. When viewed together the path segments for each of the primary colors may spatially overlap to varying degrees depending on the relative frequency, amplitude, phase, and duty cycle at which each of the primary colors is produced by oscillatory driving of the light source. By varying these driving parameters, the observer may observe a myriad of color alternation patterns along the curvilinear path, which may comprise one or more of: dark segments, bright primary color segments, bright partial secondary color segments (in which two or more but not necessarily all of the primary colors are simultaneously present), and bright total secondary color segments (in which all of the primary colors are simultaneously present). Temporal variation of the driving parameters results in temporal evolution of the color alternation pattern along the curvilinear path. Thus, by moving the light source sufficiently rapidly relative to the observer, visually striking, intriguing, and/or pleasing multicolored illuminated displays may be produced by a light source which appears monocolored when moving relatively slowly relative to the observer.

Additional objects and advantages of the present invention may become apparent upon referring to the preferred and alternative embodiments of the present invention as illustrated in the drawings and/or described in the following written

DETAILED DESCRIPTION OF PREFERRED AND ALTERNATIVE EMBODIMENTS

Figure 1:
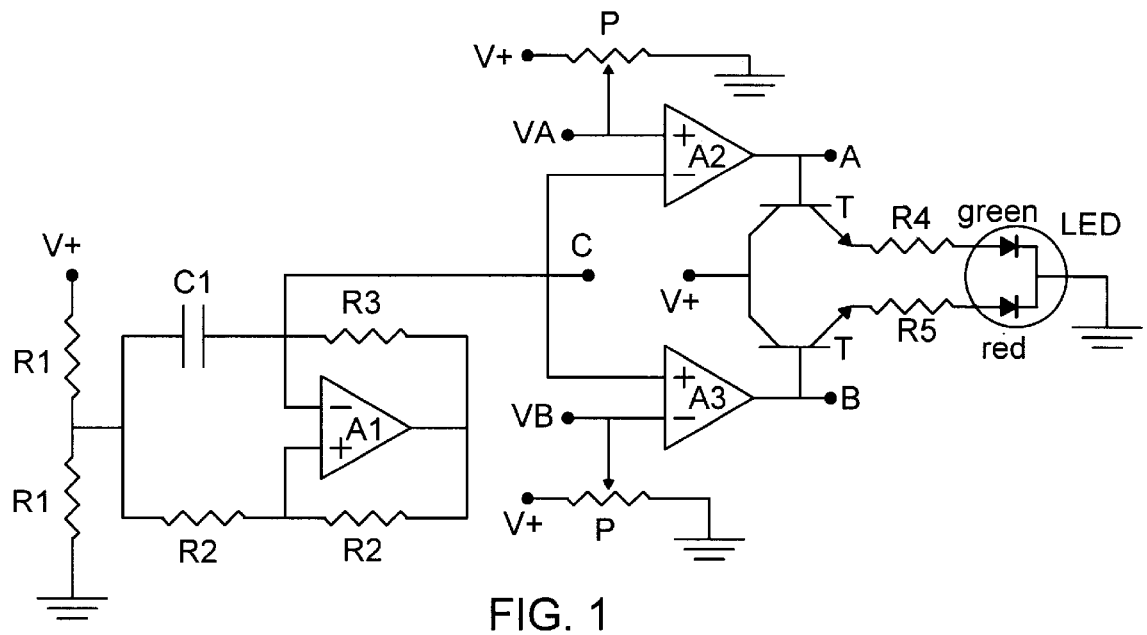
FIG. 1 is a schematic diagram of a preferred embodiment of a kinetically multicolored light source and driver circuit according to the present invention.
Figure 2:
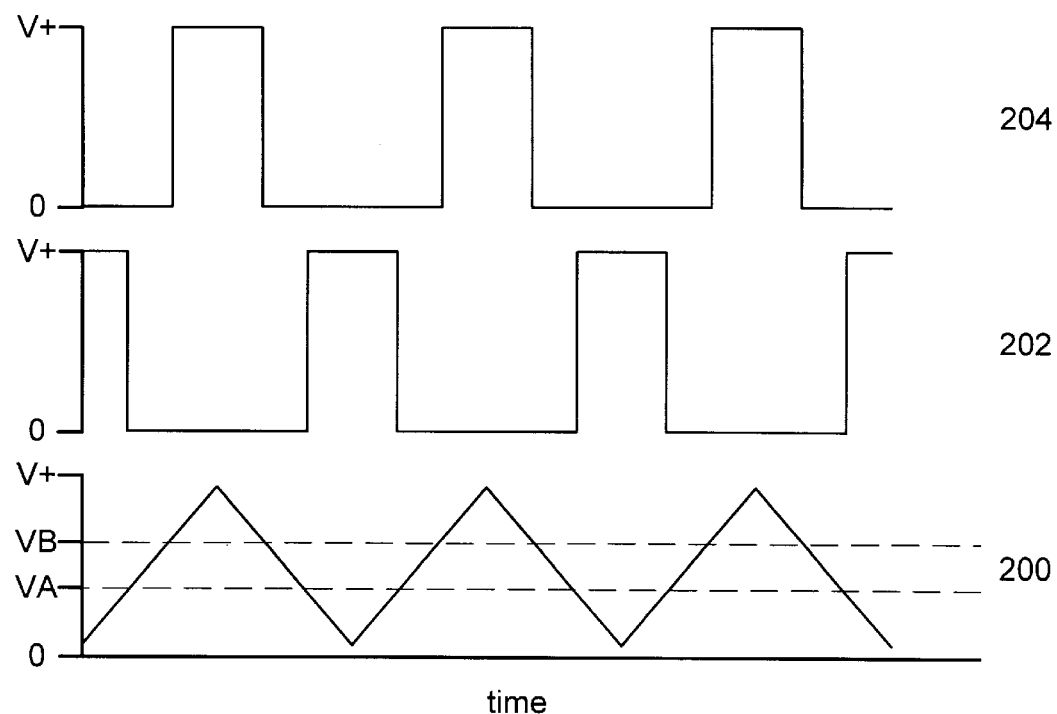
FIG. 2 shows waveforms associated with the light source and driver circuit of FIG. 1.

FIG. 1 shows a schematic diagram of a preferred embodiment of a kinetically multicolored light source and associated driver circuitry. A triangular waveform generator comprising resistors R1 (two), R2 (two), and R3, capacitor C1, and operational amplifier A1 produces a triangular waveform at point C when provided with supply voltage V+. The triangle waveform is centered at V+/2 with peak-to-peak amplitude of V+/2 (i.e., ranging from V+/4 to 3V+/4). The triangular waveform generator and other similar circuits are described in Horowitz and Hill, "The Art of Electronics" 2nd Ed. (Cambridge University Press, 1989), said text being hereby incorporated by reference as though fully set forth herein. The period of oscillation of the triangular waveform is given approximately by 2.2(R1+R3)C1. Amplifier A1 may be a MAX4129 integrated circuit from Maxim Integrated Products, and other typical values are: V+=3.3 V, R1=50Ω, R2=16 kΩ, R3=34 kΩ, and C1=0.22 μF, yielding an oscillation frequency of approximately 60 Hz and an amplitude of 1.65 V (peak-to-peak). Waveform 200 thus produced at point C is shown in FIG. 2.

The output of the waveform generator is supplied to a pair of comparators each comprising an amplifier and a potentiometer. Amplifiers A2 and A3 may be MAX4129 integrated circuits from Maxim Integrated Products, while each potentiometer P has a 20 kΩ resistance and is supplied with V+. The potentiometers are used to set comparator levels VA and VB which are input to amplifiers A2 and A3, respectively, to be compared to the triangular input waveform 200. Waveforms 202 and 204, shown in FIG. 2, are thus produced at points A and B, respectively. It should be noted that each of the comparators is identical except that the inputs to the amplifier are inverted. Therefore waveforms 202 and 204 have the same frequency and are exactly 180° out of phase. Variation of comparator voltages VA and VB by adjustment of the potentiometers results in variation of the duty cycle of waveforms 202 and 204, respectively, from 0% (always low, when VA<V+/4 or VB>3V+/4) to 100% (always high, when VA>3V+/4 or VB<V+/4).

The signals at points A and B are in turn supplied to transistors T (Radio Shack 276-1617) to control flow of current from supply voltage V+ through green and red light-emitting diodes (LED's), respectively. The green and red LED's may comprise a three-lead bicolor LED, for example a L59SRSGW/CC supplied by Kingbright. Only when the waveform at point A is high does the green LED emit light, and only when the waveform at point B is high does the red diode emit light. Resistors R4 (1.7Ω) and R5 (10Ω) limit the current which flows through the green and red LED's, respectively, and the relative resistances are chosen to balance the light output of the green and red LED's, which typically have differing efficiencies. When operated at frequencies at or above the critical fusion frequency (around 5–10 Hz) and when moving slowly relative to an observer's field of view, the bicolor LED appears to emit the secondary color yellow due to the superposition of the primary colors green and red.

Figures 3A, 3B:
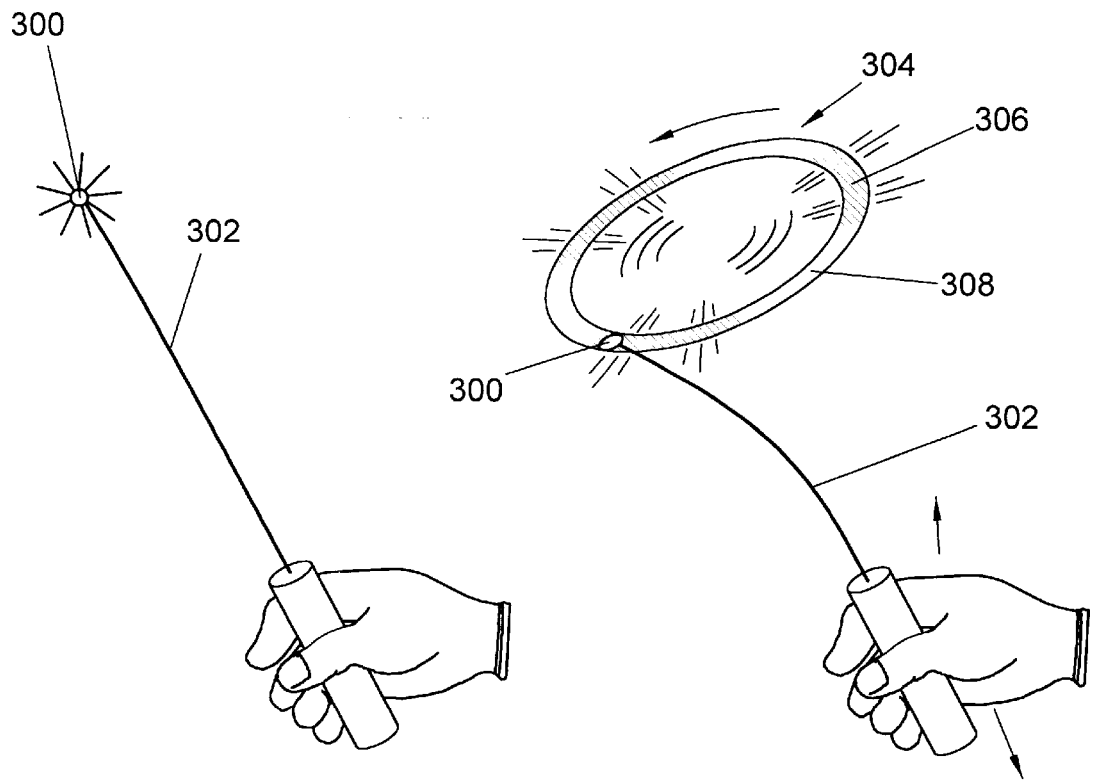
FIG. 3 (A–D) is a set of perspective views of a preferred embodiment of a kinetically multicolored light source secured to the end of a tether according to the present invention.
Figures 3C, 3D:
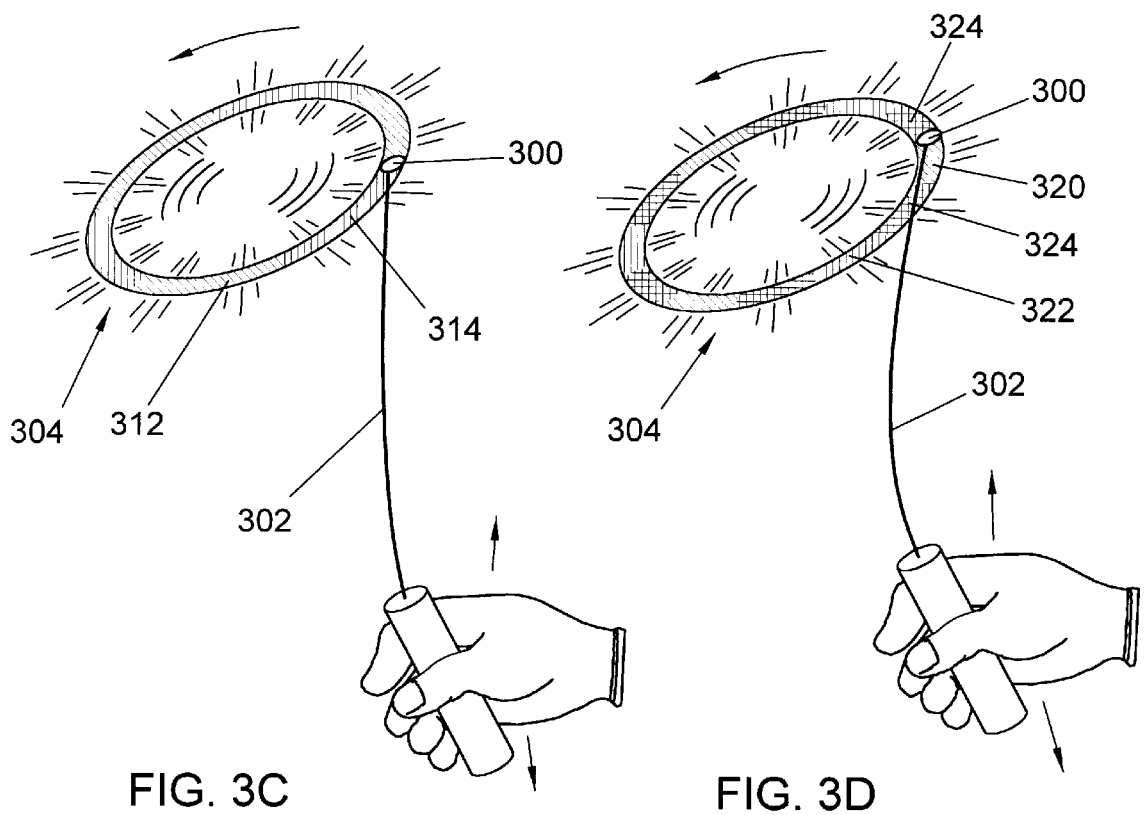

FIGS. 3A, 3B, 3C and 3D show the light patterns produced by securing a light source 300, constructed and driven as described above and in FIGS. 1 and 2, to the end of a tether 302 and spinning it in a substantially circular motion indicated by circular path 304. Light source 300 appears yellow when stationary or moving slowly, as in FIG. 3A. In FIG. 3B, circle 304 comprising bright green segments 306 and intervening dark segments 308 is shown which would result from waveform 202 of FIG. 2 if light source 300 were spun rapidly at the end of tether 302 and waveform 204 were set to a 0% duty cycle. A similar pattern of bright red segments with intervening dark segments would result from waveform 204 of FIG. 2 if light source 300 were spun rapidly at the end of tether 302 and waveform 202 were set to a 0% duty cycle. In FIG. 3C, the resulting composite illumination pattern observed is shown for the case where both the green and red LED's are driven with a 50% duty cycle and light source 300 is spun rapidly at the end of tether 302. In this instance circle 304 comprises alternating bright segments 312 and 314 of green and red, respectively. FIG. 3D depicts a composite illumination pattern observed for duty cycles greater than 50% for each of waveforms 202 and 204. In this instance circle 304 comprises bright green segments 320, bright red segments 322, and bright yellow segments 324 produced by superposition of green and red light from the LED's.

The frequency of waveforms 202 and 204 determine the appearance of the illumination pattern produced by the motion of the light source. For example, a tether about 40 cm long spun at a frequency of about 160 RPM produces illumination patterns substantially similar to those exemplified in FIG. 3 when driven at frequencies ranging from about 5 Hz to about 700 Hz. However, the frequency, duty cycle, tether length, and spinning frequency may be varied over a wide range of combinations of values to produce a myriad of differing kinetically multicolored illumination patterns comprising dark segments, bright green segments, bright red segments, and/or bright yellow segments is without departing from inventive concepts disclosed and/or claimed herein.

Figure 4A:
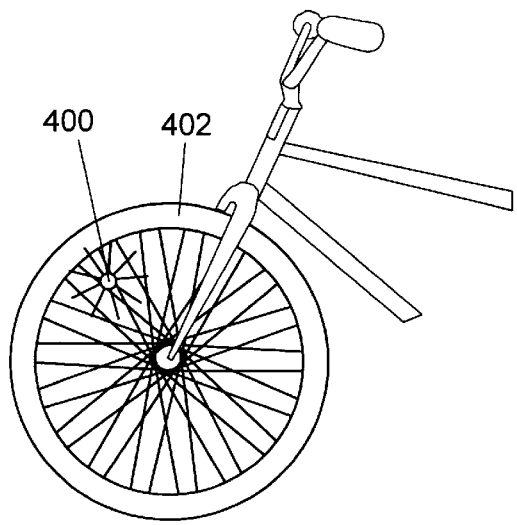
FIG. 4 (A–D) is a set of perspective views of a preferred embodiment of a kinetically multicolored light source secured to a bicycle wheel according to the present invention.
Figure 4B:
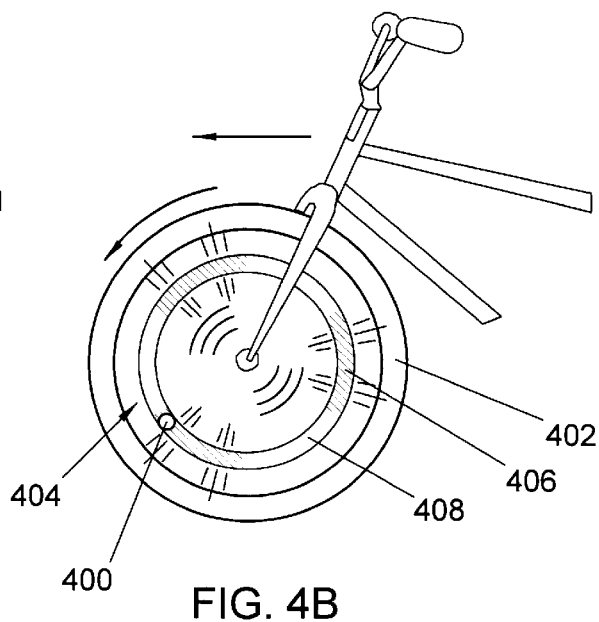
Figure 4C:
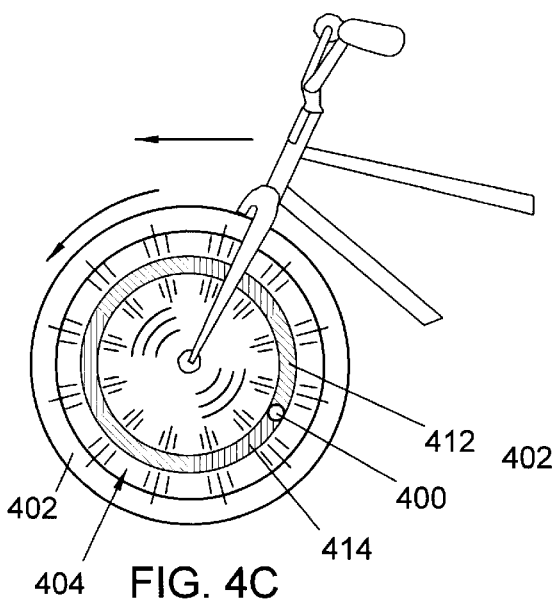
Figure 4D:
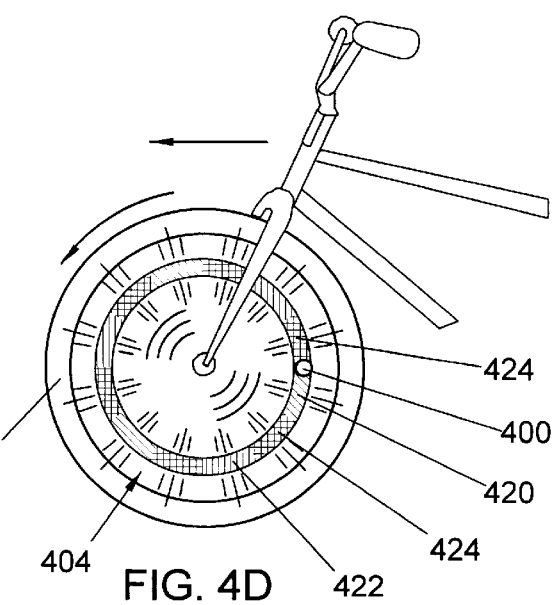

FIGS. 4A, 4B, 4C and 4D show the light patterns produced by securing a light source 400, constructed and driven as described above and in FIGS. 1 and 2, to the rim of a bicycle wheel 402 and spinning the wheel, whereby light source 400 follows a circular path 404. The illumination patterns thus produced are analogous in every respect to those of FIG. 3 and the preceding paragraphs. Light source 400 appears yellow when wheel 402 is stationary or rotating slowly, as in FIG. 4A. In FIG. 4B, circle 404 comprising bright green segments 406 and intervening dark segments 408 is shown which would result from waveform 202 of FIG. 2 if wheel 402 with light source 400 were spun rapidly and waveform 204 were set to a 0% duty cycle. A similar pattern of bright red segments with intervening dark segments would result from waveform 204 of FIG. 2 if wheel 402 with light source 400 were spun rapidly and waveform 202 were set to a 0% duty cycle. In FIG. 4C, the resulting composite illumination pattern observed is shown for the case where both the green and red LED's are driven with a 50% duty cycle and wheel 402 with light source 400 is spun rapidly. In this lo instance circle 404 comprises alternating bright segments 412 and 414 of green and red, respectively. FIG. 4D depicts a composite illumination pattern observed for duty cycles greater than 50% for each of waveforms 202 and 204. In this instance circle 404 comprises bright green segments 420, bright red segments 422, and bright yellow segments 424 produced by superposition of green and red light from the LED's. As described hereinabove, the frequency, duty cycle, radial light source position on the wheel, and wheel spinning speed may be varied over a wide range of combinations of values to produce a myriad of differing kinetically multicolored illumination patterns without departing from inventive concepts disclosed and/or claimed herein.

In an alternative embodiment of the present invention, any set of two or more primary colors may be employed to produce a kinetically multicolored display. In an alternative embodiment of the present invention, any functionally equivalent light source may be employed wherein one or more of the plurality of primary colors may be produced by oscillatory driving of the light source. Such light sources may include but are not limited to: light-emitting diode (LED) sources; laser diode sources; stroboscopic sources; incandescent sources; fluorescent sources; phosphorescent sources; functional equivalents thereof; and/or combinations thereof.

In an alternative embodiment of the present invention, the oscillatory driving means for driving the light source may comprise any functionally equivalent means for oscillatory driving of a light source, including but not limited to: one or more signal generators; one or more waveform generators; analog driver circuits; digital driver circuits; mechanically based oscillatory switches; solenoid switches; magnetic switches; functional equivalents thereof; and/or combinations thereof. The driver circuitry depicted in FIG. 1 is provided for exemplary and enablement purposes only, and should not be construed to limit the scope of the present invention. Those of ordinary skill in the electronic arts may employ a myriad of differing oscillatory driving means without departing from inventive concepts disclosed and/or claimed herein.

In an alternative embodiment of the present invention, the oscillatory driving of one or more of the primary colors may be coupled or decoupled to varying degrees. The frequencies at which one or more of the primary colors is driven may all be the same, or different frequencies may be employed for different primary colors. The frequencies may be set at fixed values, or may be allowed to vary during operation of the kinetically multicolored light source. The relative phase of the oscillatory driving of one or more of the primary colors may be set at any value from 0° to 360°, or may be allowed to vary during operation of the kinetically multicolored light source. The duty cycles at which one or more of the primary colors is driven may all be the same, or different duty cycles may be employed for different primary colors. The duty cycles may be set at fixed values, or may be allowed to vary during operation of the kinetically multicolored light source. The intensities at which each of the primary colors is driven may all be the same, or different intensities may be employed for different primary colors. The intensities may be set at fixed values, or may be allowed to vary during operation of the kinetically multicolored light source. A myriad of differing kinetically multicolored illumination patterns may be produced by varying some or all of these operating parameters in a virtually endless series of combinations without departing from inventive concepts disclosed and/or claimed herein.

In an alternative embodiment of the present invention, the light source may be secured to any person, animal, object, structure, or device capable of producing motion yielding a kinetically multicolored display, including but not limited to: a tether or tethered toy; a flexible but resilient shaft; a wand; a wheel, including but not limited to a car wheel, a truck wheel, a motorcycle wheel, a bus wheel, a trailer wheel, a train wheel, a wagon wheel, a scooter wheel, a unicycle wheel, a bicycle wheel, a tricycle wheel, a roller skate wheel, a roller blade wheel, a skateboard wheel, and/or an aircraft wheel; a helicopter rotor; an aircraft propeller; a windshield wiper; a drum stick; a baton; a ball for throwing, rolling, and/or hitting; a yo-yo; a flying disc, or Frisbee®; shoes, including but not limited to walking shoes, running shoes, athletic shoes, and/or dancing shoes; ice skates; clothing; jewelry; a costume or functional antenna; a spinning toy; an amusement park ride; a pet collar; a garment or other attachment for a pet's tail; a rotor on a helicopter "beanie"; juggled objects; a jump rope; a lariat; a real or toy sword; a baseball bat; a racquet, including but not limited to a tennis, squash, racquetball, table tennis, and/or lacrosse racquet; a golf club; a hockey stick; a hockey puck; a fly swatter; a manual or mechanical fan. A kinetically multicolored light source may be secured to any object for which a multicolored illuminated display is desired and which moves the light source sufficiently rapidly to produce such a display without departing from inventive concepts disclosed and/or claimed herein.

For purposes of this disclosure including the claims, the motion of a kinetically multicolored light source shall not be limited to motion of the light source, but shall be construed to include any relative motion of the source and the field of view of an observer giving rise to a kinetically multicolored display from a light source which is monocolored in the absence of such relative motion. For purposes of this disclosure including the claims, an observer of the kinetically multicolored light source and the multicolored display generated thereby shall not be limited to human observers only, but shall be construed to include any image detection system having sufficiently slow temporal response and/or visual persistence allowing the kinetically multicolored light source to appear monocolored when moving slowly relative to the detection system field of view but to appear multicolored when moving rapidly relative to the detection system field of view. Such image detection systems include but are not limited to: a human visual system; an animal visual system; an electronic imaging system; a still camera; a video camera; a movie camera; functional equivalents thereof; and/or combinations thereof.

The present invention has been set forth in the form of its preferred and alternative embodiments. It is nevertheless intended that modifications to the disclosed kinetically multicolored light source may be made without departing from inventive concepts disclosed and/or claimed herein.

What is claimed is:

1. A kinetically multicolored light source, comprising:
   a light source emitting a plurality of primary colors;
   oscillatory means for driving said light source having a frequency, an amplitude, a duty cycle, and a phase corresponding to each of said primary colors; and
   means for moving said light source relative to a field of view of an observer,
   wherein
   the frequently corresponding to at least one of said primary colors is above a critical fusion frequency for the observer, whereby each of said primary colors appears to the observer to emanate from said light source simultaneously and continuously when said light source moves slowly relative to the field of view of the observer and thereby appears to the observer as one total secondary color;
   said moving means moves said light source sufficiently rapidly relative to the field of view of the observer so that said at least one of said primary colors if observed alone would appear to the observer to emanate from a plurality of bright segments of a curvilinear path with intervening dark segments when driven by said oscillatory driving means;
   spatial overlap of dark segments corresponding to each of no said primary colors produces a segment of the curvilinear path which appears dark to the observer;
   spatial overlap of a bright segment corresponding to only one of said primary colors and dark segments corresponding to the others of said primary colors produces a bright segment of the curvilinear path which appears to the observer as said only one of said primary colors;
   spatial overlap of bright segments corresponding to at least two of said primary colors produces a bright segment of the curvilinear path which appears to the observer as a partial secondary color; and
   spatial overlap of bright segments corresponding to each of said primary colors produces a bright segment of the curvilinear path which appears to the observer as the total secondary color.

2. A kinetically multicolored light source as recited in claim 1, wherein said light source comprises a plurality of light-emitting diodes, each of said primary colors being emitted by at least one of said light-emitting diodes.

3. A kinetically multicolored light source as recited in claim 2, wherein each of said light-emitting diodes has a first lead and a second lead, each of said first leads of each of said light-emitting diodes being connected to a common light source lead and each of said second leads of each of said light emitting diodes being separately connected to a corresponding independent light source lead, each of said common light source lead and said independent light source leads being electrically connected to said driving means thereby allowing independent control of each of said light-emitting diodes by said driving means.

4. A kinetically multicolored light source as recited in claim 3, wherein said light source comprises a three-lead bicolor LED emitting two primary colors and comprising two light-emitting diodes.

5. A kinetically multicolored light source as recited in claim 2, wherein said light source comprises a two-lead bicolor LED comprising a first light-emitting diode and a second light-emitting diode being connected in parallel so that a forward bias applied to said first light-emitting diode concomitantly produces a reverse bias on said second light-emitting diode, whereby a drive voltage applied by said driving means across the connected first and second light-emitting diodes causes only one of the first and second light-emitting diodes to emit light, while reversal of the polarity of the drive voltage causes the other of the first and second light-emitting diodes to emit light.

6. A kinetically multicolored light source as recited in claim 1, wherein said moving means moves said light source in a substantially circular path.

7. A kinetically multicolored light source as recited in claim 6, wherein said moving means comprises a wheel onto which said light source is secured.

8. A kinetically multicolored light source as recited in claim 7, wherein said wheel is a bicycle wheel.

9. A kinetically multicolored light source as recited in claim 6, wherein said moving means comprises a tether having a first end and a second end, said light source being secured to said first end, said second end being held by a user of said light source while the user swings said light source around a substantially circular path at said first end of said tether.

10. A kinetically multicolored light source as recited in claim 1, wherein said moving means moves said light source along a substantially linear path.

11. A kinetically multicolored light source as recited in claim 1, wherein said moving means moves said light source along an irregular curvilinear path.

12. A kinetically multicolored light source as recited in claim 1, wherein said driving means drives each of said primary colors at the same frequency.

13. A kinetically multicolored light source as recited in claim 12, wherein the phase and duty cycle for each of said primary colors are chosen so that the curvilinear path comprises bright segments of each of said primary colors.

14. A kinetically multicolored light source as recited in claim 13, wherein said light source produces two primary colors and the relative phase of said two primary colors is 180°.

15. A kinetically multicolored light source as recited in claim 14, wherein each of said two primary colors has a duty cycle of 50%, whereby the curvilinear path comprises alternating bright segments of each of said two primary colors.

16. A kinetically multicolored light source as recited in claim 12, wherein the phases and duty cycles for each of said primary colors are variable, whereby the curvilinear path at various times and positions may comprise dark segments, bright segments of said primary colors, and bright segments of said secondary colors.

17. A kinetically multicolored light source as recited in claim 4, wherein:
   said moving means comprises a bicycle wheel onto which said light source is secured;
   the relative phase of the two primary colors is 180°; and
   the duty cycle of each of said two primary colors is variable, whereby the curvilinear path may comprise at various times and positions dark segments, bright segments of each of said two primary colors, and bright segments of said total secondary color.

18. A kinetically multicolored light source as recited in claim 4, wherein:
   said moving means comprises a tether having a first end and a second end, said light source being secured to said first end, said second end being held by a user of said light source while the user swings said light source around a substantially circular path at said first end of said tether;

the relative phase of the two primary colors is 180°; and the duty cycle of each of said two primary colors is variable, whereby the curvilinear path may comprise at various times and positions dark segments, bright segments of each of said two primary colors, and bright segments of said total secondary color.

19. A method for producing a kinetically multicolored light display, comprising:

driving a light source emitting a plurality of primary colors with an oscillatory driver having a frequency, an amplitude, a duty cycle, and a phase corresponding to each of said primary colors; and moving said light source relative to a field of view of an observer, wherein the frequency corresponding to at least one of said primary colors is above a critical fusion frequency for the observer, whereby each of said primary colors appears to the observer to emanate from said light source simultaneously and continuously when said light source moves slowly relative to a field of view of the observer thereby appearing to the observer as one total secondary color;

said light source is moved sufficiently rapidly relative to the field of view of the observer so that said at least one of said primary colors if observed alone would appear to the observer to emanate from a plurality of bright segments of a curvilinear path with intervening dark segments when driven by said oscillatory driving means;

spatial overlap of dark segments corresponding to each of said primary colors produces a segment of the curvilinear path which appears dark to the observer;

spatial overlap of a bright segment corresponding to only one of said primary colors and dark segments corresponding to the others of said primary colors produces a bright segment of the curvilinear path which appears to the observer as said only one of said primary colors;

spatial overlap of bright segments corresponding to at least two of said primary colors produces a bright segment of the curvilinear path which appears to the observer as a partial secondary color; and spatial overlap of bright segments corresponding to each of said primary colors produces a bright segment of the curvilinear path which appears to the observer as the total secondary color.

20. A method for producing a kinetically multicolored light display as recited in claim 19, wherein said light source comprises a plurality of light-emitting diodes, each of said primary colors being emitted by at least one of said light-emitting diodes.

21. A method for producing a kinetically multicolored light display as recited in claim 20, wherein each of said light-emitting diodes has a first lead and a second lead, each of said first leads of each of said light-emitting diodes being connected to a common light source lead and each of said second leads of each of said light emitting diodes being separately connected to a corresponding independent light source lead, each of said common light source lead and said independent light source leads being electrically connected to said driving means thereby allowing independent control of each of said light-emitting diodes by said driving means.

22. A method for producing a kinetically multicolored light display as recited in claim 21, wherein said light source comprises a three-lead bicolor LED emitting two primary colors and comprising two light-emitting diodes.

23. A method for producing a kinetically multicolored light display as recited in claim 20, wherein said light source comprises a two-lead bicolor LED comprising a first light-emitting diode and a second light-emitting diode being connected in parallel so that a forward bias applied to said first light-emitting diode concomitantly produces a reverse bias on said second light-emitting diode, whereby a drive voltage applied by said driving means across the connected first and second light-emitting diodes causes only one of the first and second light-emitting diodes to emit light, while reversal of the polarity of the drive voltage causes the other of the first and second light-emitting diodes to emit light.

24. A method for producing a kinetically multicolored light display as recited in claim 19, wherein said light source moves in a substantially circular path.

25. A method for producing a kinetically multicolored light display as recited in claim 24, wherein motion of said light source in the substantially circular path arises from rotation of a wheel with said light source secured thereto.

26. A method for producing a kinetically multicolored light display as recited in claim 25, wherein said wheel is a bicycle wheel.

27. A method for producing a kinetically multicolored light display as recited in claim 24, wherein motion of said light source in the substantially circular path arises from said light source being secured to a first end of a tether and a second end of said tether being held by a user of said light source while the user swings said light source around a substantially circular path at said first end of said tether.

28. A method for producing a kinetically multicolored light display as recited in claim 19, wherein said light source moves along a substantially linear path.

29. A method for producing a kinetically multicolored light display as recited in claim 19, wherein said light source moves along an irregular curvilinear path.

30. A method for producing a kinetically multicolored light display as recited in claim 19, wherein said each of said primary colors is driven at the same frequency.

31. A method for producing a kinetically multicolored light display as recited in claim 30, wherein the phase and duty cycle for each of said primary colors are chosen so that the curvilinear path comprises bright segments of each of said primary colors.

32. A method for producing a kinetically multicolored light display as recited in claim 31, wherein said light source produces two primary colors and the relative phase of said two primary colors is 180°.

33. A method for producing a kinetically multicolored light display as recited in claim 32, wherein each of said two primary colors has a duty cycle of 50%, whereby the curvilinear path comprises alternating bright segments of each of said two primary colors.

34. A method for producing a kinetically multicolored light display as recited in claim 30, wherein the phases and duty cycles for each of said primary colors are variable, whereby the curvilinear path at various times and positions may comprise dark segments, bright segments of said primary colors, and bright segments of said secondary colors.

35. A method for producing a kinetically multicolored light display as recited in claim 22, wherein:

said light source is secured to a bicycle wheel and is moved in a circular path by rotation thereof;

the relative phase of the two primary colors is 180°; and the duty cycle of each of said two primary colors is variable, whereby the curvilinear path may comprise at various times and positions dark segments, bright segments of each of said two primary colors, and bright segments of said total secondary color.

36. A method for producing a kinetically multicolored light display as recited in claim 22, wherein:

motion of said light source in a substantially circular path arises from said light source being secured to a first end of a tether and a second end of said tether being held by a user of said light source while the user swings said light source around a substantially circular path at said first end of said tether;

the relative phase of the two primary colors is 180°; and the duty cycle of each of said two primary colors is variable, whereby the curvilinear path may comprise at various times and positions dark segments, bright segments of each of said two primary colors, and bright segments of said total secondary color.

* * * * *